(12) United States Patent
Gross et al.

(10) Patent No.: US 8,324,496 B1
(45) Date of Patent: Dec. 4, 2012

(54) LOW-PROFILE SINGLE-AXIS TRACKER WITH WIND MITIGATION

(75) Inventors: William Gross, Pasadena, CA (US); Jean-Paul Labrosse, Altadena, CA (US); Matthew N. Schneider, Los Angeles, CA (US)

(73) Assignee: First Solar, Inc., Perrysburg, OH (US)

( * ) Notice: Subject to any disclaimer, the term of this patent is extended or adjusted under 35 U.S.C. 154(b) by 987 days.

(21) Appl. No.: 12/315,953

(22) Filed: Dec. 8, 2008

Related U.S. Application Data (60) Provisional application No. 61/005,697, filed on Dec. 7, 2007.

(51) Int. Cl.
*F24J 2/46* (2006.01)
(52) U.S. Cl. ......................................... 136/246; 126/571
(58) Field of Classification Search .................... 136/246
See application file for complete search history.

(56) References Cited

U.S. PATENT DOCUMENTS

| | | | | |
|---|---|---|---|---|
| 3,856,193 | A * | 12/1974 | Bott | 224/316 |
| 4,773,944 | A * | 9/1988 | Nath et al. | 136/249 |
| 2007/0151594 | A1 * | 7/2007 | Mascolo et al. | 136/245 |

OTHER PUBLICATIONS

"Screen" Oxford English Dictionary, Second Edition, 1989.*

* cited by examiner

*Primary Examiner* — Jennifer Michener
*Assistant Examiner* — Magali P Slawski
(74) *Attorney, Agent, or Firm* — Dickstein Shapiro LLP (57) ABSTRACT

Wind screens for reducing wind loading on one or more solar collectors are disclosed. The wind screens move with the solar collector as the collector tracks the sun in one or more dimensions. The wind screen pivotably connects to at least one solar panel of the collector. Another side of the wind screen may connect to the ground or to an adjacent collect, thus serving to divert wind over the collector. Wind screens may be made of various materials including rigid, flexible, or elastic materials and can change position, orientation, and/or effective length as the one or more collectors track the sun from East to West.

36 Claims, 12 Drawing Sheets

LOW-PROFILE SINGLE-AXIS TRACKER WITH WIND MITIGATION

CROSS-REFERENCE TO RELATED APPLICATION(S)

This application claims the benefit of U.S. Provisional Patent Application Ser. No. 61/005,697 filed Dec. 7, 2007, entitled "LOW-PROFILE SINGLE-AXIS TRACKER WITH WIND MITIGATION," which is hereby incorporated by reference herein for all purposes.

TECHNICAL FIELD

The invention generally pertains to solar collectors for generating power from the sun. In particular, the invention pertains to a technique for mitigating the effects of wind on a solar tracker or array of solar trackers.

BACKGROUND

Some solar collectors employ a tracking system that enables the collector to dynamically orient the collector and optimize the acquired energy. As the collector tracks the sun as it moves from East to West over the course of a day, the orientation of the collector may, at times, expose the collector to significant wind loading. As a result, the solar collector must be engineered with a more rigid structure and stronger supports which adds to the construction and/or installation cost of the collector. If the wind speed exceeds a threshold, the solar collector may even retreat to a stow mode in which suboptimal solar power or no power is acquired. There is therefore a need for a solar collector that is less sensitive to wind loading in order to reduce the cost of the solar collector and increase the time that the collector actively tracks the sun.

SUMMARY

The invention features one or more wind screens for shielding the solar collector from lateral winds. In some embodiments, the solar collector includes one or more solar panels that pivot about single axis in order to track the sun over the course of the day. The wind screen may comprise one or more screens that couple the outer edges of the panels to the ground so as to divert the wind over the collector. In some other embodiments, the solar collector includes an array of collectors in which solar units are arranged side-by-side. The wind screens then connect to adjacent solar collectors so as to provide a continuous surface across the array and inhibit wind from generating lift under any of the units. Of course, a combination of these ground-attached screens and cross-collector screens may be employed together in order to mitigate wind at the edges and interior of a solar collector array.

The wind screens in the present invention are configured to move with the one or more collector to which it is connected. In particular, the wind screens can change position, orientation, and/or dimensions as the one or more collectors track the sun from East to West. In some embodiments, for example, the wind screen is pivotably connected to a solar panel so that the screen may shift and elevate as the edge of the panel pitches upward. In other embodiments, the wind screen is a flexible fabric one or more rollers, thus allowing it to roll up or unwind as the gap between adjacent solar collectors changes.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Illustrated in FIGS. 1-4 is a low-profile solar collector that follows the sun with a single-axis mechanism. In addition to efficiently collecting light, the collector is configured to mitigate the effects of winds that exert dynamic loads on the collector and its mounting structure. To achieve this, the collector employs one or more wind screens that pivot to deflect wind over the top of the collector for the range of motion exhibited during tracking operations.

The low-profile solar collector 100 in the preferred embodiment comprises one or more photovoltaic (PV) solar panels 110, reflectors, or lenses; a base 120 rotatably mounted to panels via a pivot 322 at the apex of an end mount 124; and a plurality of wind screens that are rotatably connected to the panels and base. The panels 110 are configured to rotate about a longitudinal axis that coincides with the center of the pivot 322. During tracking operations, the panels 110 are configured to rotate through an angular range to maximize the energy collected from the sun. In particular, the panels 110 rotate from a first orientation shown in FIG. 3 to the second orientation shown in FIG. 4. The angular displacement of the panels between FIGS. 3 and 4 corresponds to approximately 25 degrees in the preferred embodiment, although this may be tailored to the application. As one skilled in the art will appreciate, the longitudinal axis is generally oriented in the North-South direction or East-West direction when the collector is installed.

The low-profile solar collector 100 in the preferred embodiment further includes one or more wind screens 130, 132 that divert lateral winds up and over the top of the panels 110. Each of the screens 130, 132 has a proximal end pivotably connected to the panel 110 and a distal end pivotably connected to a tab 350 via a hinge 340, for example. Each of the tabs 350 is held captive in a recessed slot that runs the length of the base 120, thereby allowing the tabs to slide in the horizontal direction. As the panels 110 rotate, the distal ends of the wind screens 130, 132 slide one direction or the other to compensate for raising or lowering of the panel edges. At all times, the panels and screens cooperate to form a substantially continuous surface starting from the distal end of the upwind screen and ending at the distal end of the downwind screen. The combination of panels and screens also present a gradually sloping surface to the wind whether the wind approaches from the East or West, which can help to prevent a lifting force from being exerted on the solar collector 100. With the distal ends of the screens located immediately adjacent to the mounting surface, wind is also inhibited from getting under the collector where it might generate a lifting force. The mounting surface on which the collector is installed may be the ground, a south-facing roof, a flat roof, or a carport, for example.

The one or more wind screens 130, 132 in the preferred embodiment are solid panels of sheet metal, e.g., aluminum, powder coated steel, or galvanized steel. In other embodiments, however, a wind screen may include a perforated sheet like a residential window screen or a solid sheet with louvers cut into it. A wind screen with perforations, orifices, apertures, or louvers, for example, may be configured to enable a moderate amount of air to pass under the panels to reduce the collector's aerodynamic drag and remove waste heat produced by the panels. The screen may also be made from a non-perforated material including metal sheets, corrugated steel, plastic sheets, or fiberglass sheets, for example.

In the preferred embodiment, the panels 110 and wind screens are driven by an actuator (not shown) configured to induce a torque on one or more panels. The actuator may include a linear actuator, motor and gear set, motor and lead screw, or combination thereof. The motor may include, for example, a stepper motor to incrementally turn the direction in the direction of the sun. The linear actuator may include, for example, an electric, hydraulic, or pneumatic drive that periodically or continuously turns the panels and rotates the wind screens by pushing and/or pulling the distal end of one or more wind screens where they engage the slotted tracked in the base 120.

The actuator that aims the panel 110 is driven by a tracking control configured to maximize the collected power. The tracking controller may be closed-loop tracking system that determines the proper panel orientation based on a feedback signal from the panels themselves, or be an open-loop tracking system that orients the panels based on the time of day determined from an internal clock. In some other embodiments, the collector employs a self-power mechanism taught in copending provisional patent application No. 60/874,994 filed Dec. 15, 2006, which is hereby incorporated by reference herein.

In some embodiments, the wind screen is configured to connect two or more adjacent solar panels 110 or connect multiple panels associated with two or more adjacent solar collector 100, thereby providing wind mitigation for an array of single-axis solar collectors. Illustrated in FIG. 5, for example, are two representative solar collectors that share a common wind screen that creates a continuous surface that inhibits wind from inducing lift in the collectors. The first collector includes first solar panel 502, a base 504, and pivot 506 enabling the panel to rotate relative to the base. Similarly, the second collector includes second solar panel 552, a base 554, and pivot 556 enabling the panel 552 to rotate relative to its base. The first solar panel 506 is connected to the second solar panel 552 using a multi-part wind screen comprising two or more portions 512, 562. The first portion 512 of the wind screen 512 is rotatably coupled to the first panel using hinge 510, for example, while the second portion 562 of the wind screen 562 is rotatably coupled to the second panel 552 with hinge 560. The first and second portions 512, 562 are held in slidably relationship to one another using guides 514, 564.

Figure 1:
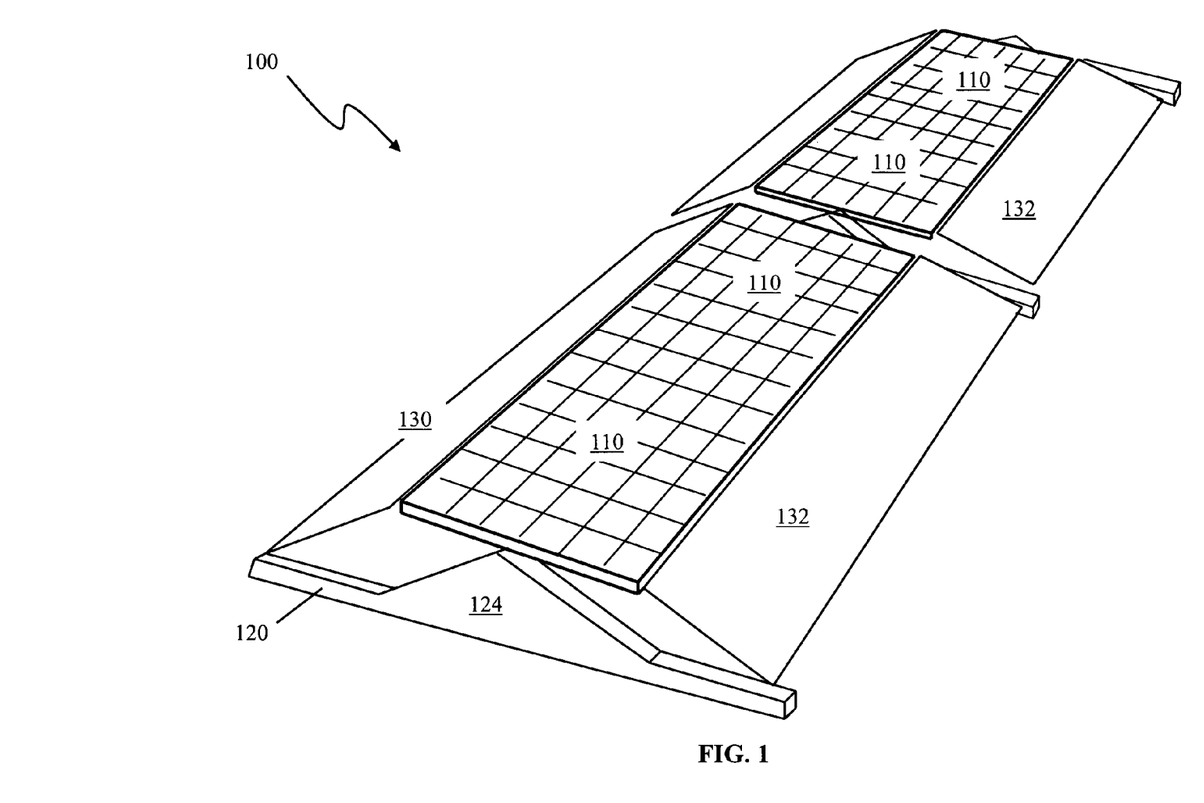
FIG. 1 is a perspective view of the low-profile single-axis tracker, in accordance with the preferred embodiment of the present invention.
Figure 2:
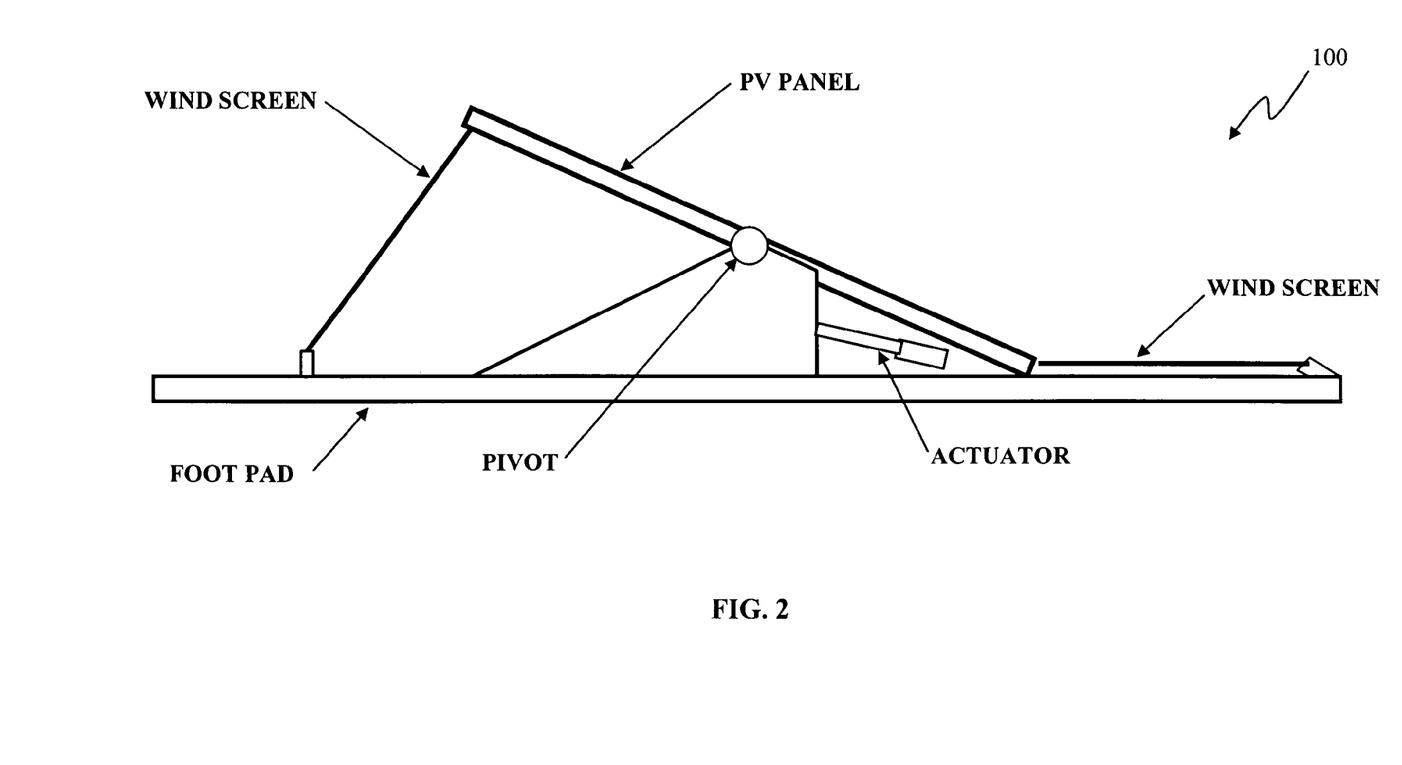
FIG. 2 is a side view of the low-profile single-axis tracker, in accordance with the preferred embodiment of the present invention.
Figure 3:
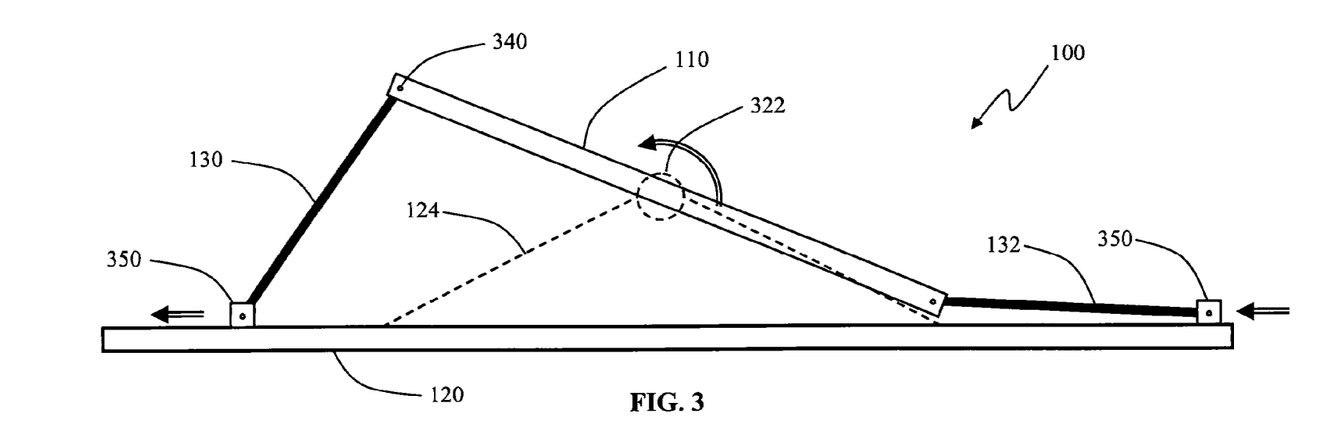
FIGS. 3 and 4 are side views of the low-profile single-axis tracker in two tracking positions, in accordance with the preferred embodiment of the present invention.
Figure 4:
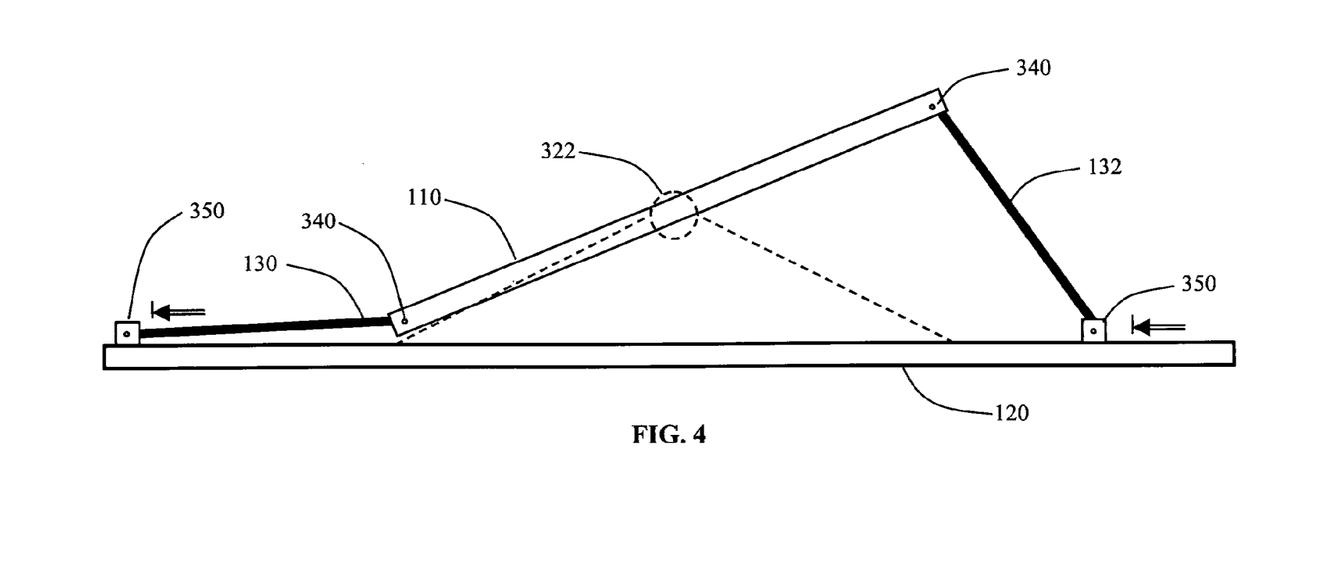
Figure 5:
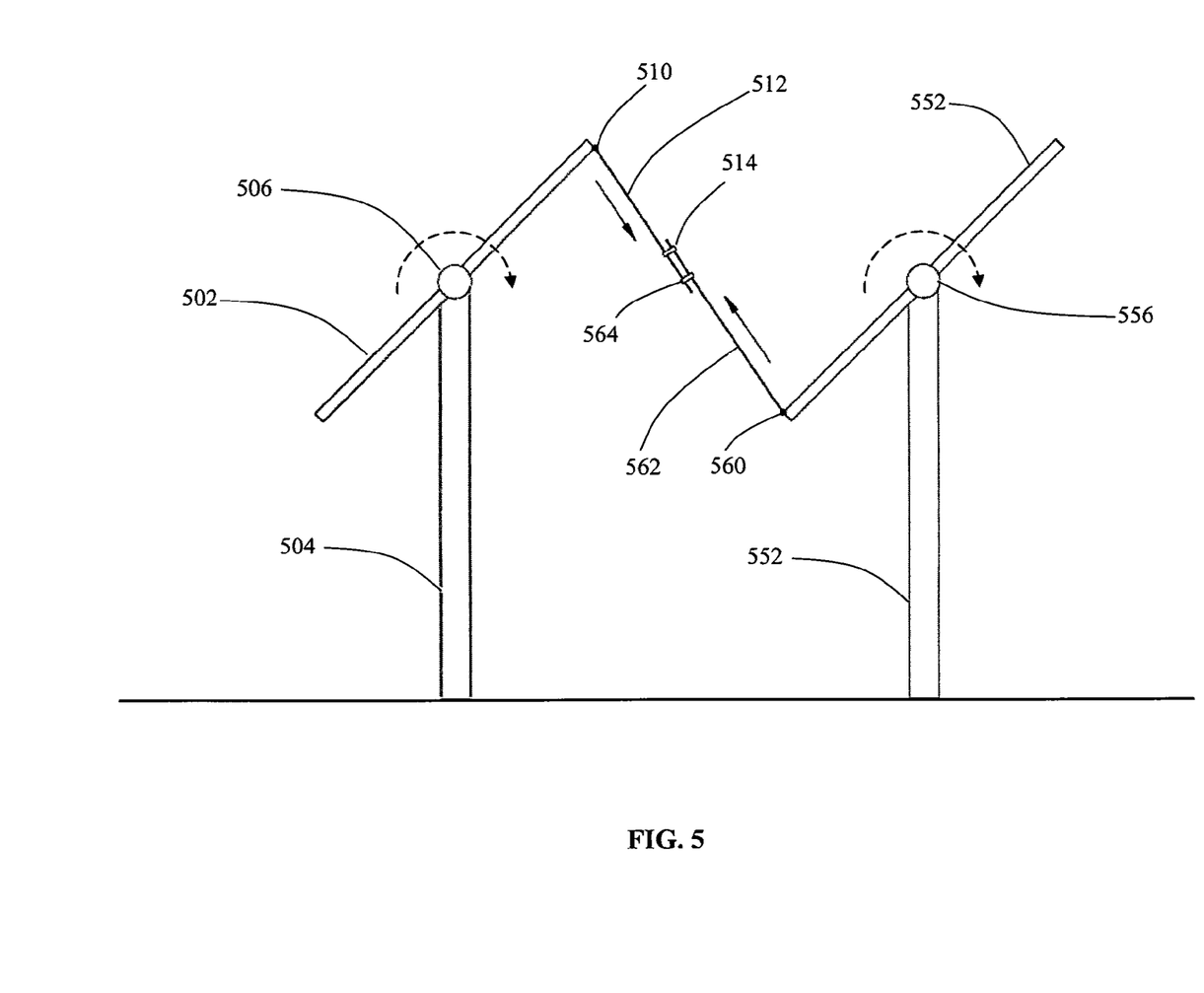
FIG. 5 is a side view of the single-axis tracker with two-part screen, in accordance with a preferred embodiment of a present invention.

As the first and second panels track the sun, the distance between the first hinge 510 and second hinge 560 changes which then causes the effective length of the wind screen to change. In particular, the first and second portions slide in a co-linear manner in which the distance between portions is fixed. As one skilled in the art will appreciate, the first and second portions 512, 562 are sized and configured to substantially obstruct any gap that might permit wind from getting under the down-wind panel throughout the entire range of motion of the two panels 502, 552.

Figure 6:
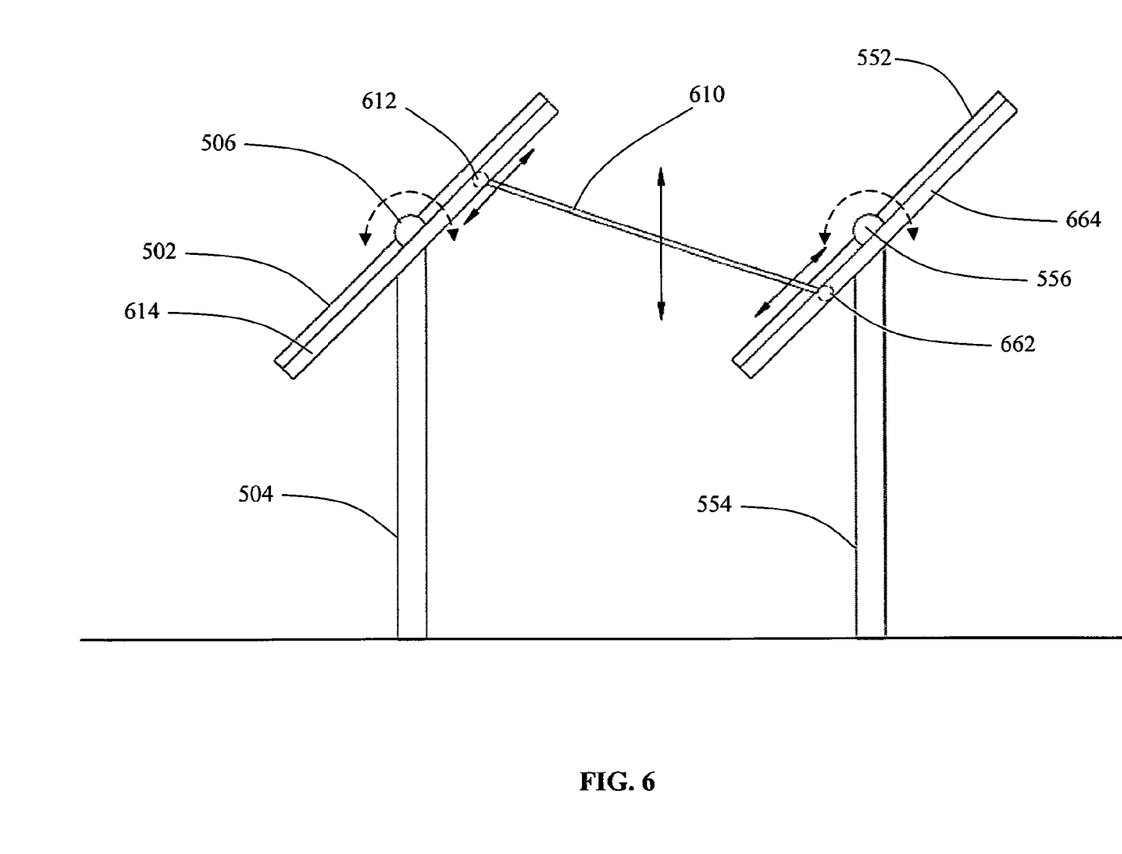
FIG. 6 is a side view of the single-axis tracker with sliding screen, in accordance with a preferred embodiment of the present invention.

Illustrated in FIG. 6 is another embodiment of a cross-collector wind screen that provides an obstructing surface between adjacent solar panels. In the embodiment, the wind screen 610 includes a single rigid sheet that couples to the first collector by means of a first pin 612 held captive in a slotted channel 614 and couples to the second collector by means of a second pin 662 held captive in a slotted channel 664. As the first and second panels track the sun, the ends of the wind screen 610 coinciding with pins 612, 662 slide within their respective channels so as to compensate for the change in distance between the solar panels.

Figure 7:
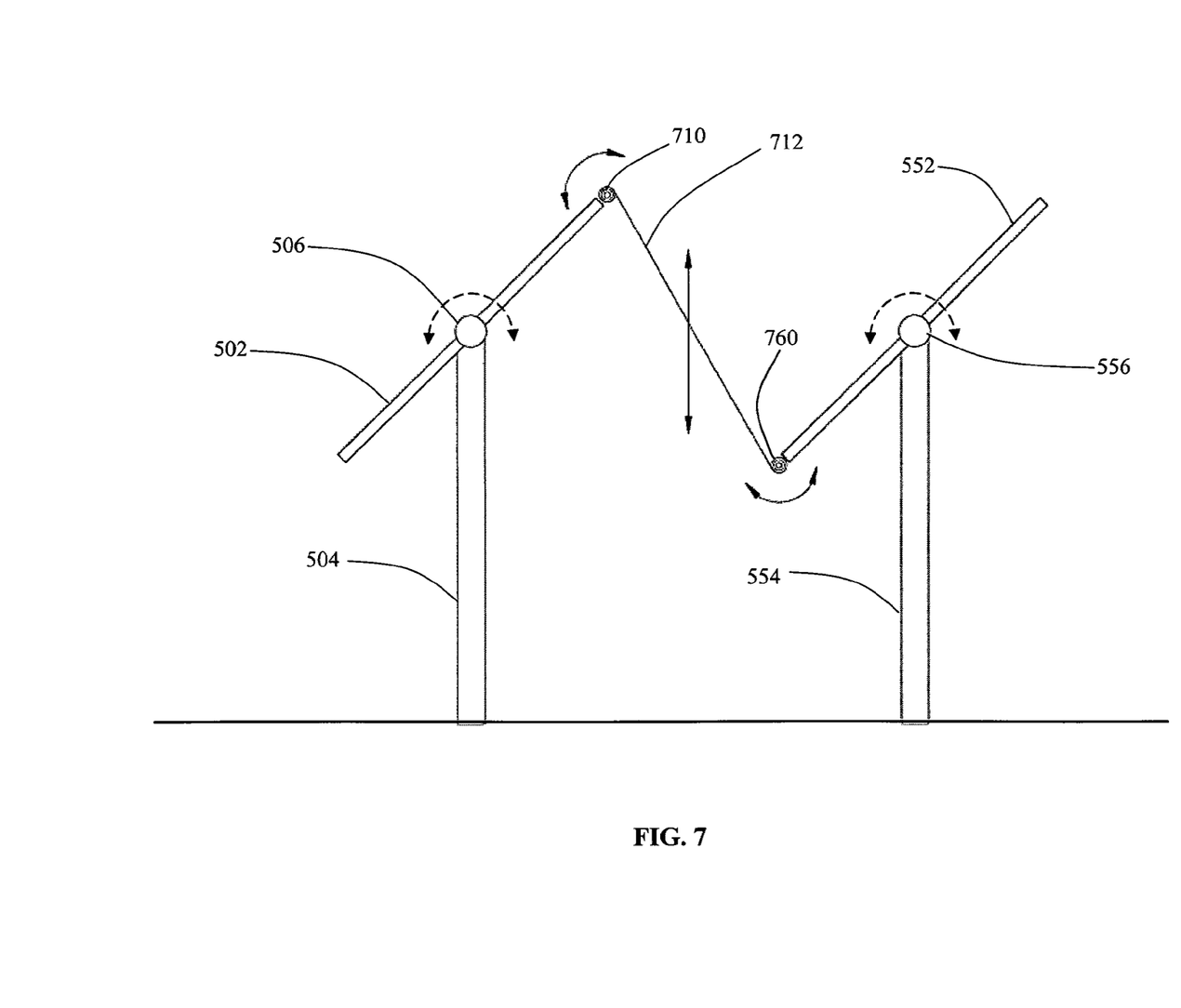
FIGS. 7 and 8 are side views of the single-axis tracker with retractable screens, in accordance with a preferred embodiment of the present invention.

Illustrated in FIG. 7 is another embodiment of a cross-collector wind screen employed between adjacent solar panels. In this embodiment, the wind screen 712 includes a single flexible sheet that couples to the first collector by means of a first roller 710 and couples to the second collector by means of a second roller 760. Each of the rollers 710, 760 includes a biasing spring (not shown) that induces a torque to encourage the rollers to retract. As the first and second panels track the sun and the distance between the adjacent ends of the panels is reduced, the rollers automatically retract and real in the slack so as to keep tension on the ends of the wind screen 712. As the distance between the ends of the panels increases, the flexible sheet is forced to unwind from the rollers 710, 760.

Figure 8:
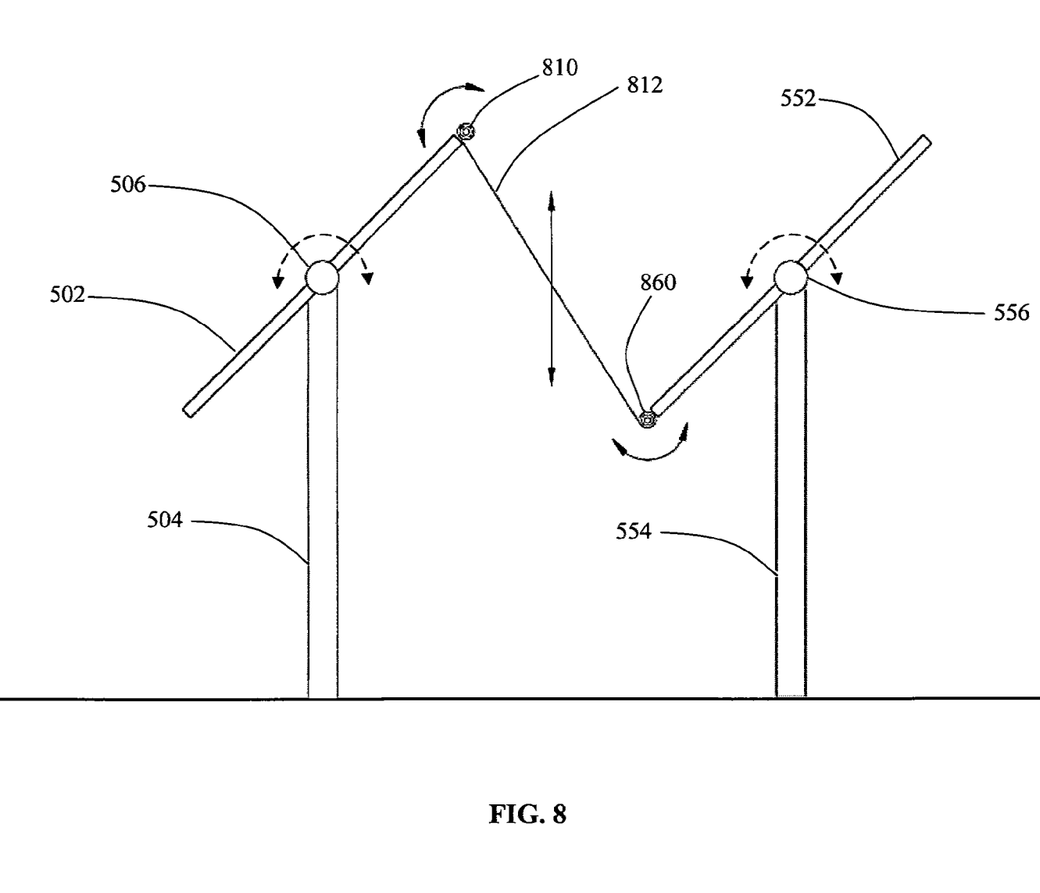

Illustrated in FIG. 8 is another embodiment of a cross-collector wind screen 812 with single flexible sheet. As in FIG. 7, the embodiment in FIG. 8 employs rollers 810, 860 that couple to the first panel 502 and second panel 552. Each of the rollers 810, 860 includes a biasing spring (not shown) that induces a torque to encourage the rollers to retract. As the first and second panels track the sun and the distance between the adjacent ends of the panels changes, the rollers retract or unwind to keep tension on the ends of the wind screen 712. Unlike FIG. 7, the rollers 810, 860 are configured on the panels so that one roller turns in the clockwise direction while the other turns in the counter-clockwise direction, and vise versa.

Figure 9:
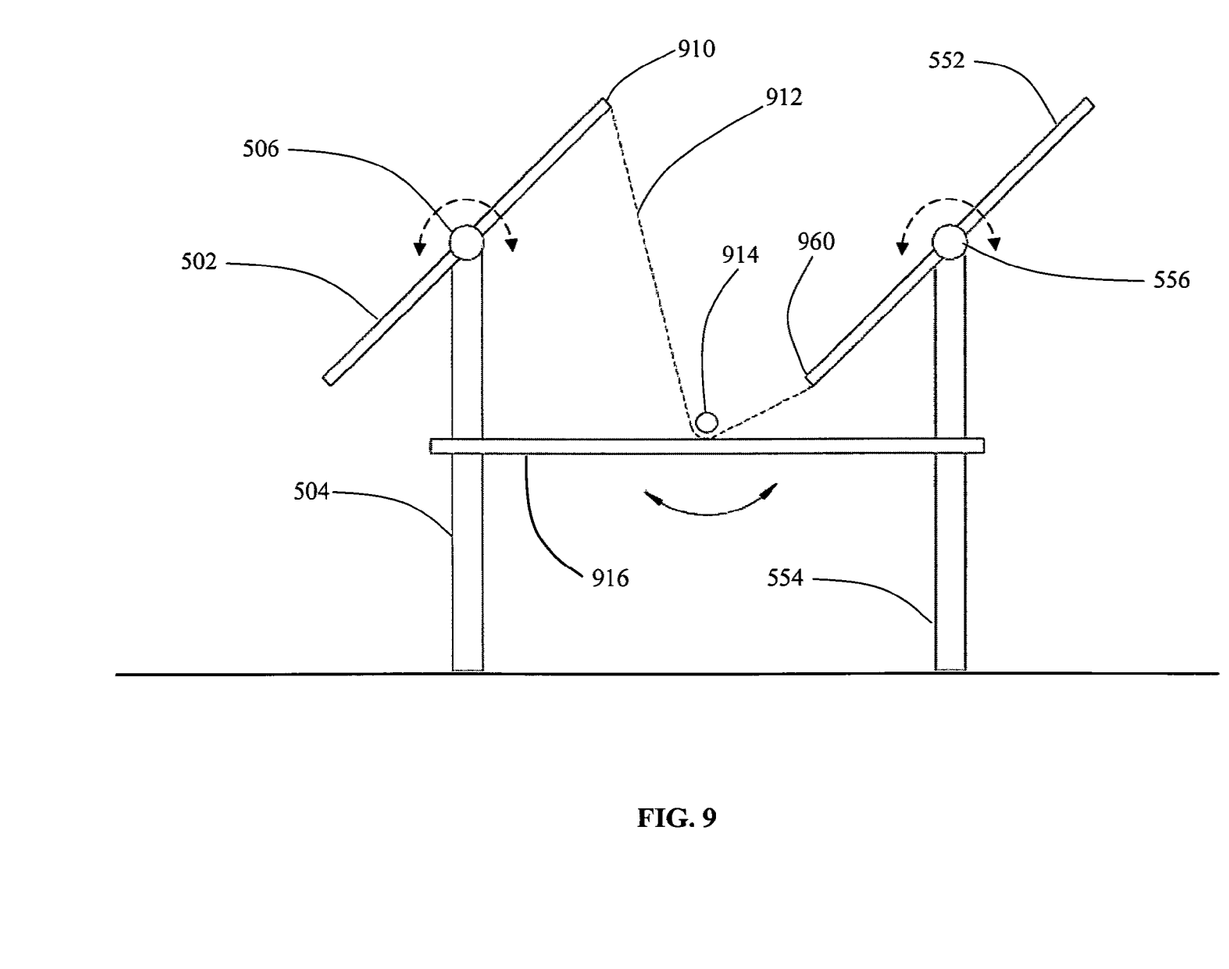
FIG. 9 is a side view of the single-axis tracker with tensioned screen, in accordance with a preferred embodiment of the present invention.

Illustrated in FIG. 9 is another embodiment of a cross-collector wind screen with a flexible but non-elastic sheet 912. In this embodiment, the wind screen is fixedly attached to the first panel 502 at edge 910 and fixedly attached to the second panel 552 at edge 960. The wind screen 912 is held taunt by adjusting the lateral position of a rod 914 positioned over the screen 912 and runs parallel to the axis associated with pivots 506, 556. Although the screen 912 is free to move relative to the rod 914, the rod is position such that the screen possesses little or no slack. As the panels 502, 552 rotate, the rod 914 can be moved either to the left or the right. One skilled in the art will appreciate, however, that the tension induced in the wind screen 912 should selected such that the effect on the tracking position of the associated panels in minimal.

Figure 10:
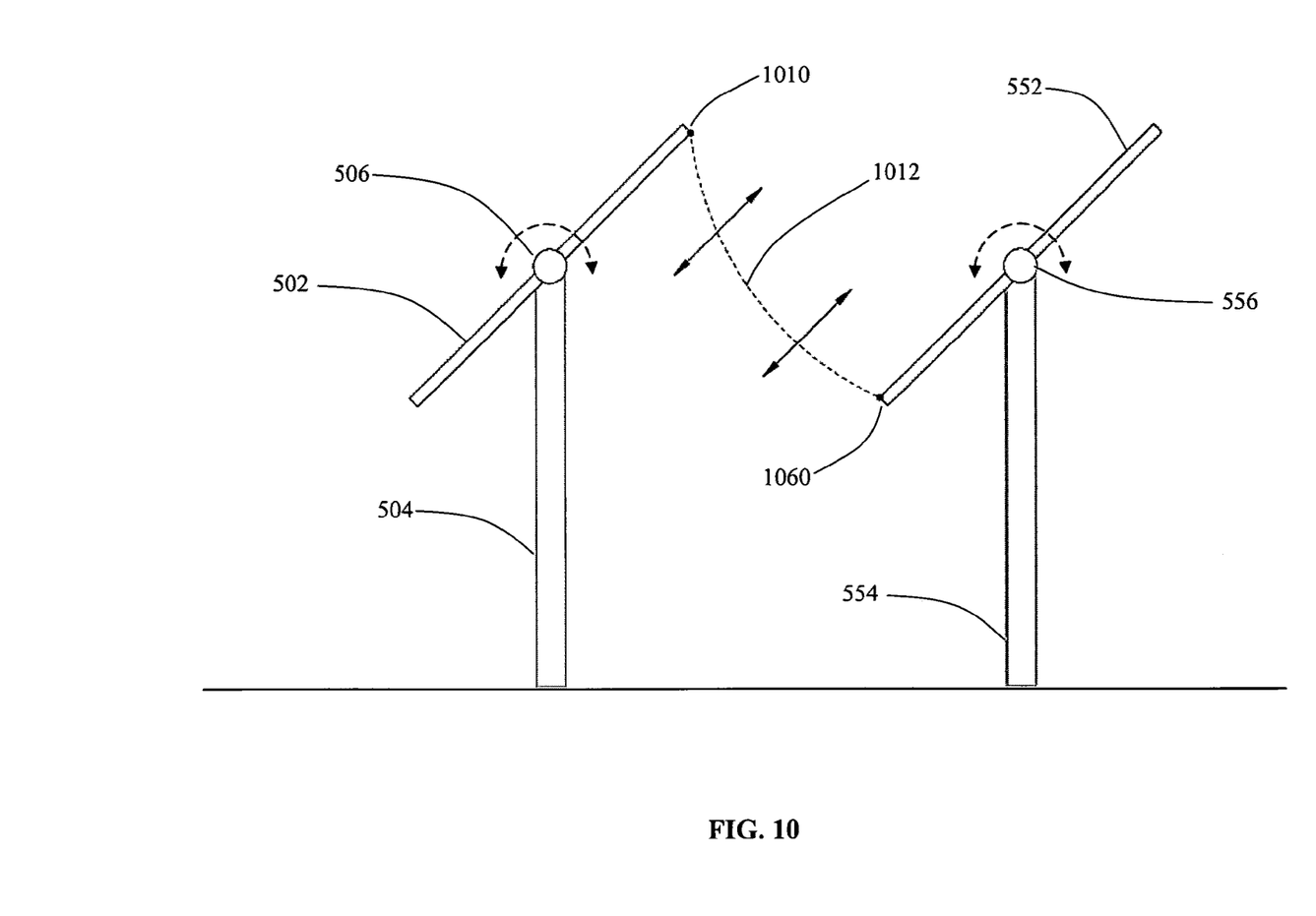
FIG. 10 is a side view of the single-axis tracker with a flexible, inelastic screen, in accordance with a preferred embodiment of the present invention.

Illustrated in FIG. 10 is another embodiment of a cross-collector wind screen with a flexible but non-elastic sheet 1012. In this embodiment, the wind screen is fixedly attached to the first panel 502 at edge 1010 and fixedly attached to the second panel 552 at edge 1060. As the panels rotate and the distance between edges 1010, 1060 changes, the wind screen 1012 is permitted to drape between the collectors in an unrestricted manner.

Figure 11:
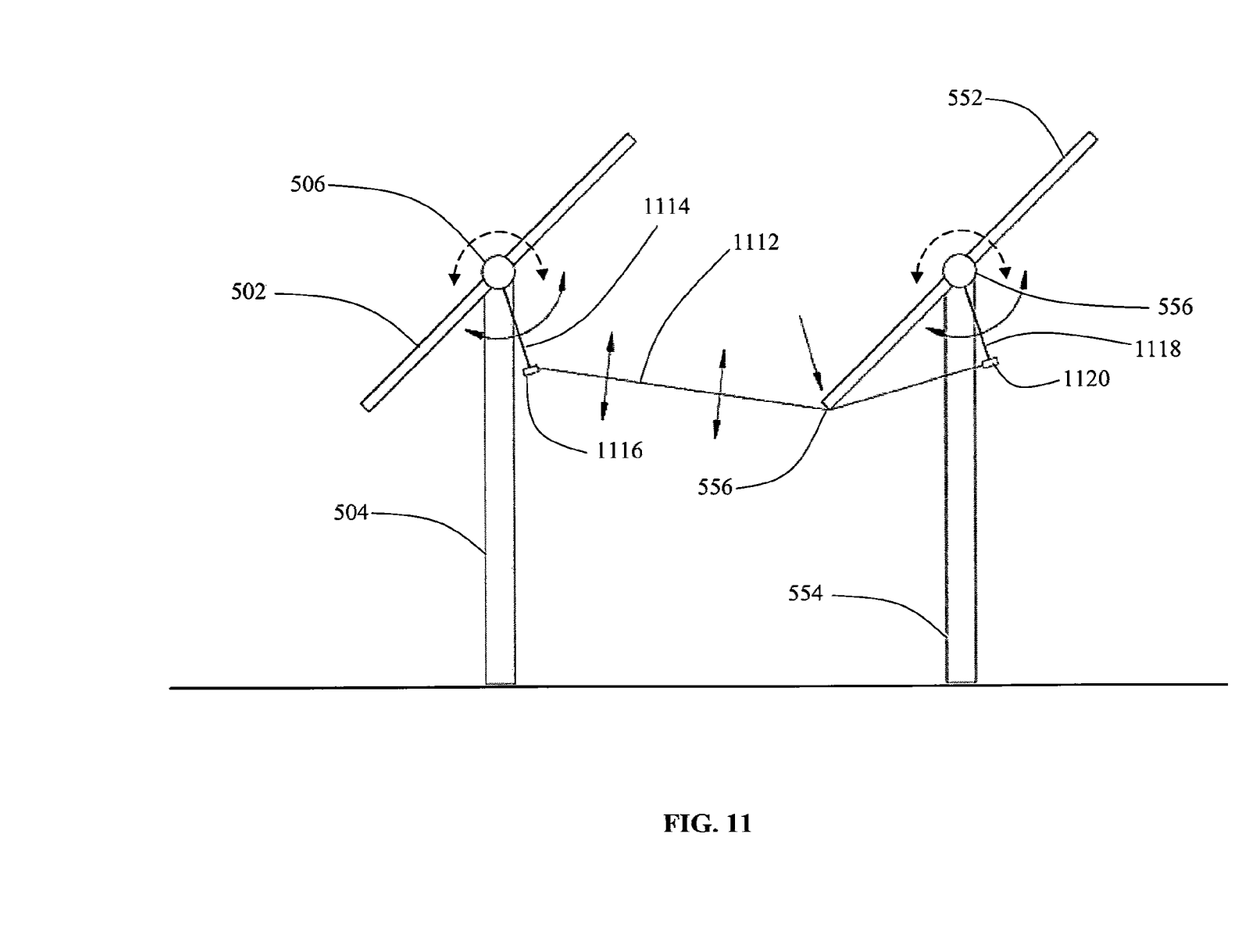
FIG. 11 is a side view of another single-axis tracker with flexible, elastic screen, in accordance with a preferred embodiment of the present invention.

Illustrated in FIG. 11 is an embodiment of a cross-collector wind screen with a elastic sheet 1112. In this embodiment, the first solar panel 502 includes a lever arm 1114 in fixed angular relationship with the panel. Similarly, the second solar panel 552 includes a second lever arm 1118 in fixed angular relationship with that panel. The sheet 1112 is then fixedly attached to the distal end of the first lever 1114 at point 1116, and fixedly attached to the distal end of the second lever arm 1118 at point 1120. As the panels 502, 552 rotate, the sheet 1112 shifts substantially laterally to create a continuous wind barrier between adjacent solar collectors. If and when the second solar panel 552 reaches an extreme angular position, a lower end 556 of the panel interferes with the sheet 1112. The sheet responds 1112 by stretching to conform to the underside of the panel. In doing so, the wind screen provides an continuous wind barrier between the adjacent solar collectors.

In an alternate version of the embodiment shown in FIG. 11, one or more of the lever arms 1114, 1118 are configured to be flexible or pivotable with a spring bias. In turn, the screen material 1112 may be selected to be flexible but inelastic material. Thus, the wind screen generally moves in unison with the rotation of the solar panels 502, 552. If and when a panel rotates to an angle sufficient to interfere with the screen 1112, one or more of the lever arms 1114, 1118 flexes or rotates to compensate for the downward deflection of the wind screen. One will appreciate that the lever arms should be biased to maintain tension across the flexible sheet 1112 over the range of motion of the solar panels.

Figure 12:
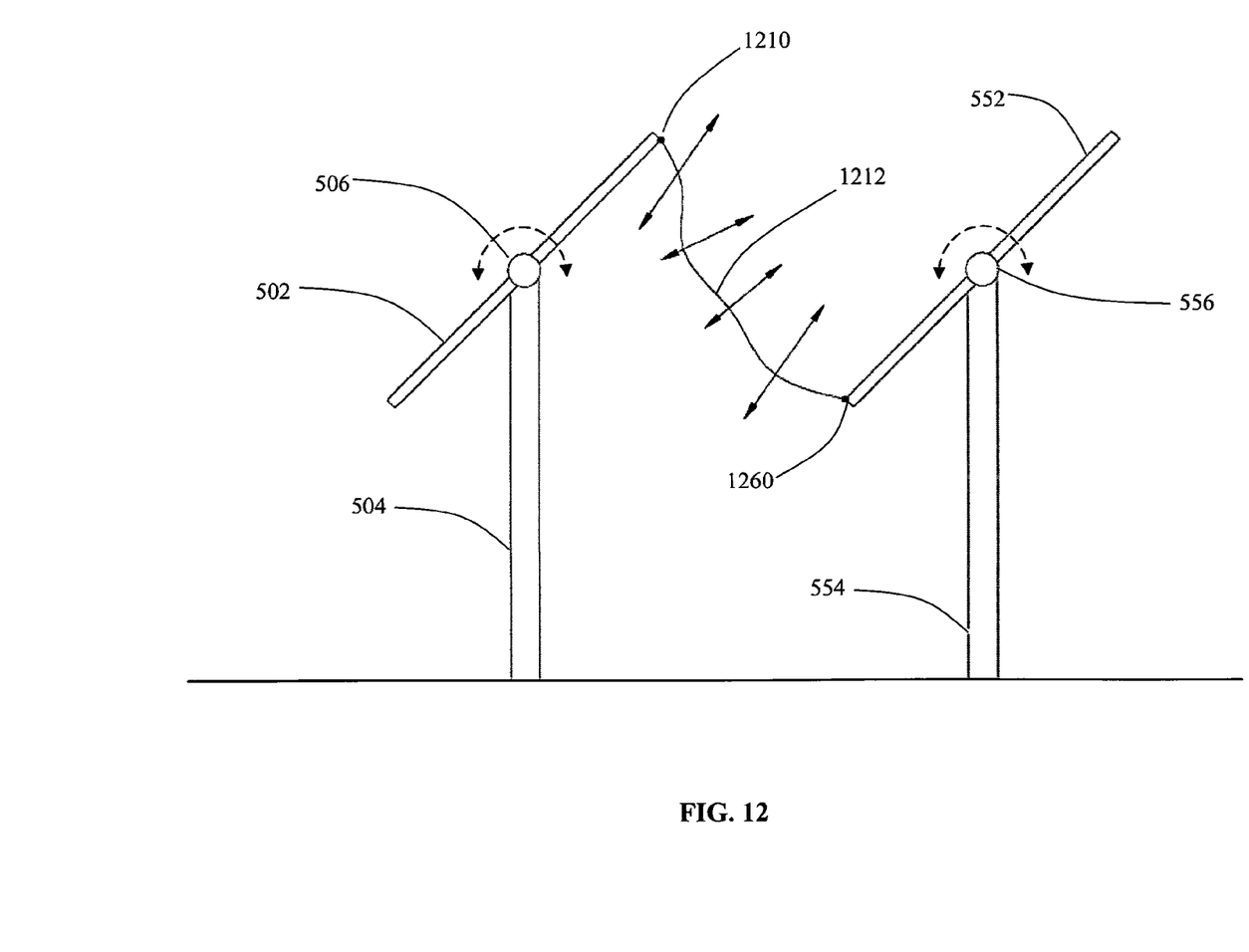
FIG. 12 is a side view of the single-axis tracker with elastic screen, in accordance with a preferred embodiment of the present invention.

Illustrated in FIG. 12 is another embodiment of a cross-collector wind screen with a flexible, elastic sheet 1212. In this embodiment, the wind screen is fixedly attached to the first panel 502 at edge 1210 and fixedly attached to the second panel 552 at edge 1260. As the panels rotate and the distance between edges 1010, 1060 changes, the sheet 1212 stretches or contracts to fill the distance between the two collectors.

Figure 13:
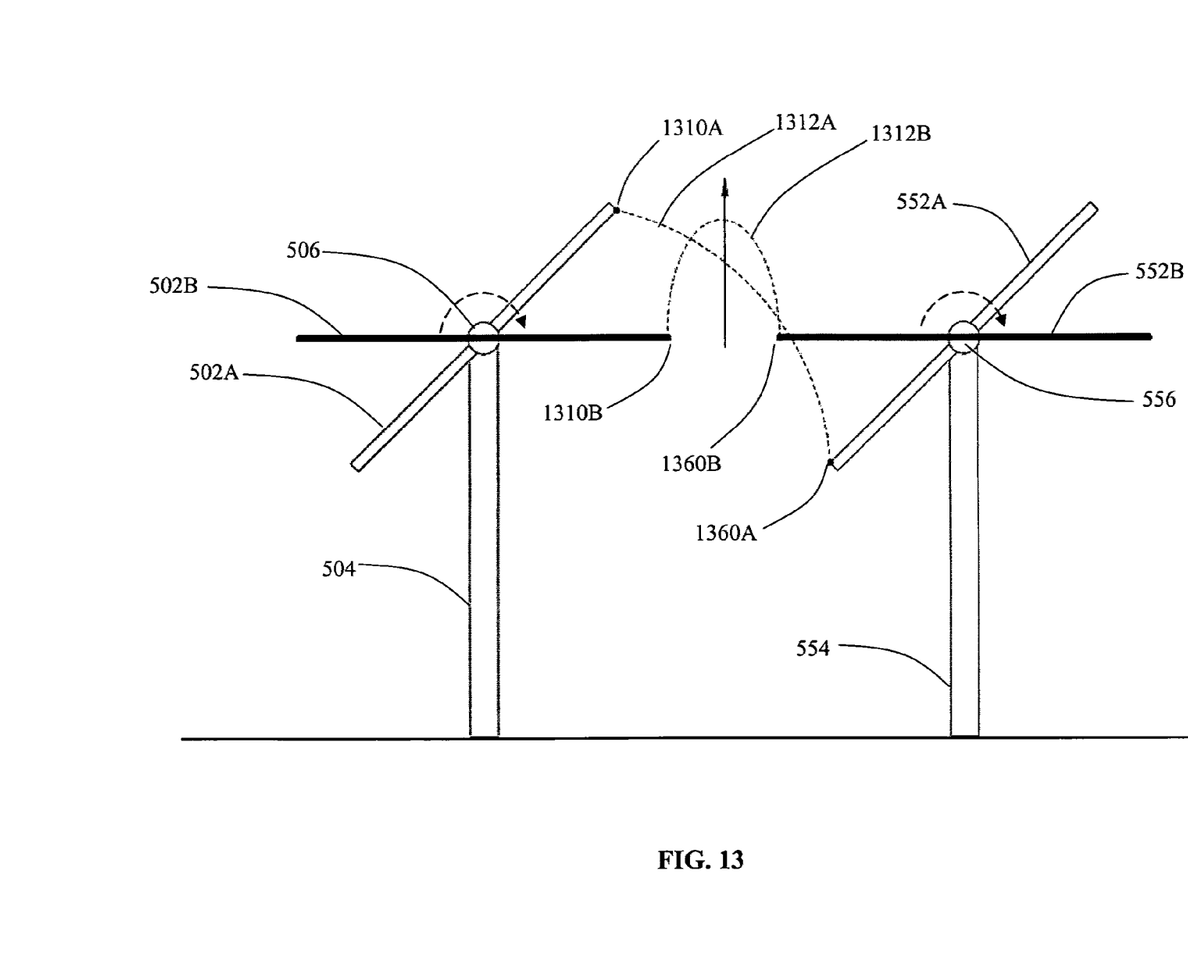
FIG. 13 is a side view of the single-axis tracker with deformable screen, in accordance with a preferred embodiment of the present invention.

Illustrated in FIG. 13 is another embodiment of a cross-collector wind screen with a flexible, semi-rigid sheet 1312. The wind screen is fixedly attached to the first panel 502 at edge 1310A, 1310B and fixedly attached to the second panel 552 at edge 1360A, 1360B. When the first and second panels are in the inclined positions (illustrated by white rectangles 502A, 502B), the sheet 1312 remains in a slightly bowed position 1312A between panels. However, when the panels are rotated to inclined positions (illustrated by solid rectangles 552, 552B), the sheet 1312 assumes a highly bowed or arced position 1312B between the panels. Throughout all tracking angles, however, the wind screen provides a continue surface between adjacent solar panels.

Wind screens may made from a number of material including, but not limited to: perforated metal, louvers or blinds, netting, matting, metal sheets or steel more generally, fiberglass or other composite material, wire or chain mesh, reinforced or unreinforced metal foil, polymer films, glass or clear plastic, wood or other organic material, shade fabric, or flexible thin film configured to generate electricity from light incident on the screen. In wind screens in some embodiments also be transparent or possess a reflective surface or diffuse surface so as to redirect light incident on the screen to an adjacent solar collector. The light reflected from the wind screen may be redirected to the either the front side of the collector facing the sun or to the back side of the solar panel (opposite the sun) if the solar panel is a bi-facial panel configured to receive light from both sides. Bifacial photovoltaic panels are available from SANYO Solar (U.S.A.) L.L.C., Carson, Calif.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A solar collector comprising:
   a base;
   at least one photovoltaic panel pivotably connected to the base; and
   at least one wind screen pivotably connected directly to the at least one photovoltaic panel;
   wherein the at least one wind screen is configured to redirect at least a portion of air flow from under the at least one photovoltaic panel such that it flows over the at least one panel as the panel pivots with respect to the base.

2. The solar collector of claim 1, wherein the at least one wind screen is slidably connected to the base.

3. The solar collector of claim 1, wherein the windscreen comprises a sheet of material, wherein the sheet material is substantially rigid.

4. The solar collector of claim 1, wherein the windscreen comprises a sheet of material, wherein the sheet material comprises a screen.

5. The solar collector of claim 1, wherein the windscreen comprises a sheet of material, wherein the sheet material comprises one or more perforations, orifices, apertures, or louvers.

6. A solar collector comprising:
   a first photovoltaic panel configured to rotate with respect to a first pivot point; and
   a first windscreen directly connected to the first photovoltaic panel along a longitudinal extent of the first windscreen, wherein the first windscreen is configured to change orientation relative to the first photovoltaic panel when the first photovoltaic panel rotates about the first pivot point.

7. The solar collector of claim 6, wherein the first windscreen is rotatably connected to the photovoltaic panel.

8. The solar collector of claim 6, wherein the first windscreen is slidably connected to a first base.

9. The solar collector of claim 6, further comprising a first base, wherein the first photovoltaic panel is mounted to the first base at the first pivot point.

10. The solar collector of claim 6, wherein the first windscreen is configured to redirect wind over a top surface of the first photovoltaic panel.

11. The solar collector of claim 8, wherein the first windscreen is rotatably connected to the first base.

12. The solar collector of claim 6, wherein the first windscreen comprises at least one of a perforation, orifice, aperture, or louver.

13. The solar collector of claim 6, wherein the first windscreen comprises at least one of a flexible thin film configured to generate electricity from light incident to the screen, a metal sheet, corrugated steel, a plastic sheet, a fiberglass sheet, wire mesh, chain mesh, unreinforced metal foil, reinforced metal foil, polymer film, glass, or wood.

14. The solar collector of claim 6, wherein the first windscreen comprises a solid sheet.

15. The solar collector of claim 6, wherein the first windscreen comprises at least one of aluminum, powder coated steel, or galvanized steel.

16. The solar collector of claim 6, further comprising a second windscreen, wherein the first windscreen is rotatably attached to a first longitudinal side of the photovoltaic panel and the second windscreen is rotatably attached to a second longitudinal side of the photovoltaic panel, opposite the first longitudinal side.

17. The solar collector of claim 16, wherein the first and second windscreens are slidably connected to a first base.

18. The solar collector of claim 6, wherein the first photovoltaic panel is configured to rotate +/−25 degrees from a horizontal position.

19. The solar collector of claim 6, further comprising a second photovoltaic panel configured to rotate with respect to a second pivot point, wherein the windscreen is also configured to change orientation relative to the second photovoltaic panel when the second photovoltaic panel rotates about the second pivot point.

20. The solar collector of claim 19, further comprising a second windscreen, wherein the first windscreen is slidably connected to the second windscreen.

21. The solar collector of claim 20, wherein the first windscreen is rotatably connected to the first photovoltaic panel and the second windscreen is rotatably connected to the second photovoltaic panel.

22. The solar collector of claim 19, wherein the first windscreen is rotatably connected to the first photovoltaic panel along a first longitudinal side and rotatably connected to the second photovoltaic panel along a second longitudinal end opposite the first longitudinal side.

23. The solar collector of claim 22, wherein the first windscreen is slidably connected to the first photovoltaic panel along the first longitudinal side and slidably connected to the second photovoltaic panel along the second longitudinal end opposite the first longitudinal side.

24. The solar collector of claim 23, wherein the first windscreen is rigid.

25. The solar collector of claim 22, wherein the first windscreen is flexible, and further comprising:

a first roller, wherein the first windscreen is coupled to the first photovoltaic panel by way of the first roller and configured to wrap around the first roller; and a first biasing spring configured to induce torque on the first roller such that the first roller maintains tension on the first windscreen and the first windscreen retracts about the first roller.

26. The solar collector of claim 25, further comprising:

a second roller, wherein the first windscreen is coupled to the second photovoltaic panel by way of the second roller and configured to wrap around the second roller; and a second biasing spring configured to induce torque on the second roller such that the second roller maintains tension on the first windscreen and the first windscreen retracts about the second roller.

27. The solar collector of claim 26, wherein the first roller and the second roller rotate in the same direction.

28. The solar collector of claim 26, wherein the first roller rotates in the clockwise direction and the second roller rotate in the counter-clockwise direction.

29. The solar collector of claim 19, wherein the windscreen is fixed to the first photovoltaic panel along a first longitudinal side and fixed to the second photovoltaic panel along a second longitudinal end opposite the first longitudinal side.

30. The solar collector of claim 29, further comprising a rod, wherein the rod is configured to be in contact with the windscreen and positioned such that the rod induces tension in the windscreen to reduce slack in the windscreen.

31. The solar collector of claim 29, wherein the windscreen comprises a flexible, non-elastic sheet.

32. The solar collector of claim 19, further comprising a first lever arm configured to pivot about the first pivot point and associated with the first photovoltaic panel and a second lever arm configured to pivot about the second pivot point and associated with the second photovoltaic panel, wherein the windscreen is affixed along a first longitudinal edge to the first lever arm and affixed along a second longitudinal edge to the second lever arm.

33. The solar collector of claim 32, wherein the first lever arm pivots with a spring bias and the second lever arm pivots with a spring bias.

34. The solar collector of claim 32, wherein the first lever arm pivots in a fixed angular relationship to the first photovoltaic panel and the second lever arm pivots in a fixed angular relation ship to the second photovoltaic panel.

35. The solar collector of claim 29, wherein the windscreen comprises a flexible, elastic sheet.

36. The solar collector of claim 29, wherein the windscreen comprises a flexible, semi-rigid sheet.

* * * * *